June 20, 1950 C. S. ASH 2,512,049
EXPANSION BRAKE INCLUDING BALANCED ACTUATING MECHANISM
Filed Oct. 20, 1944 4 Sheets-Sheet 2

INVENTOR.
Charles S. Ash.
BY
Hobart N. Durham
Attorney

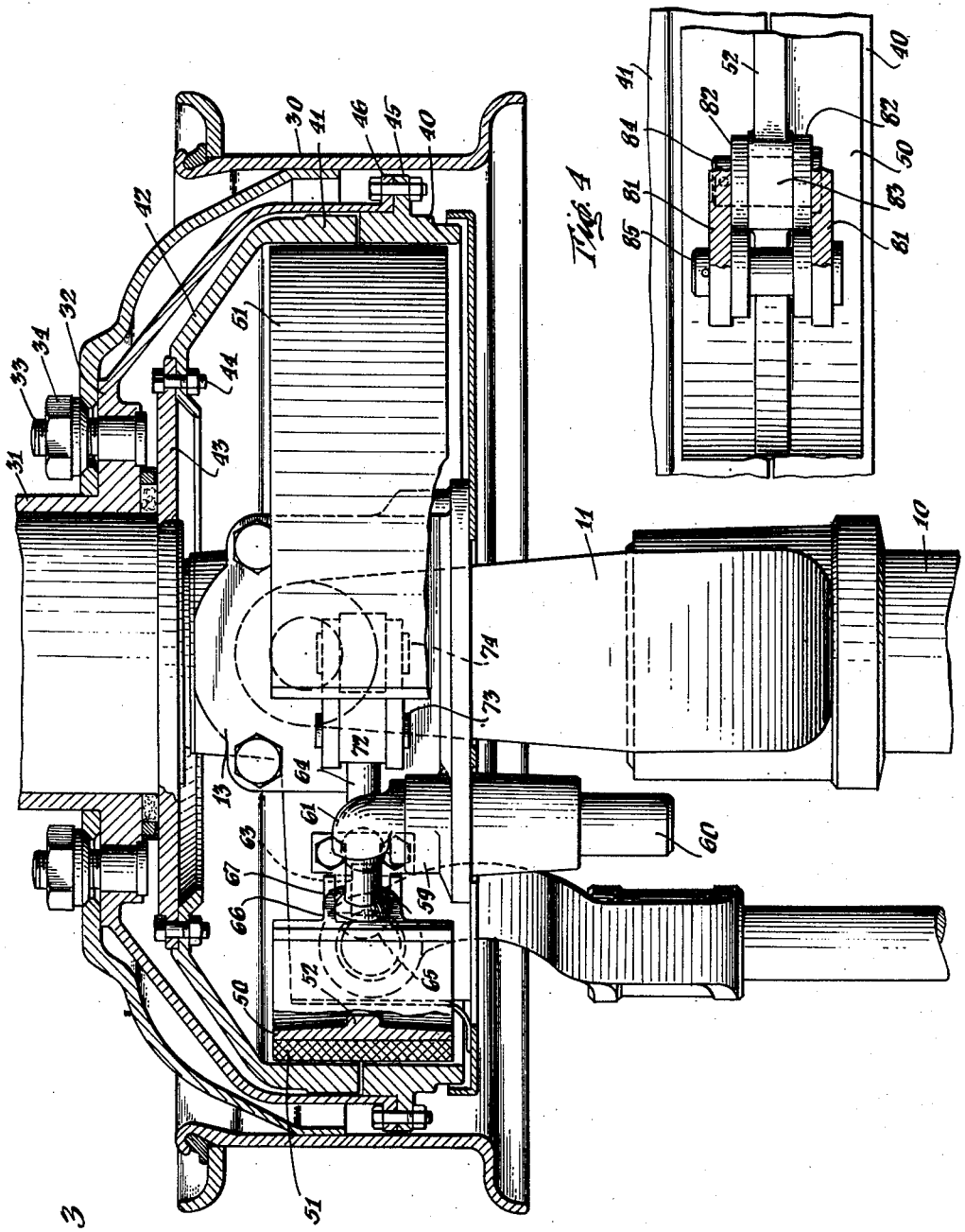

June 20, 1950 C. S. ASH 2,512,049
EXPANSION BRAKE INCLUDING BALANCED ACTUATING MECHANISM
Filed Oct. 20, 1944 4 Sheets-Sheet 4
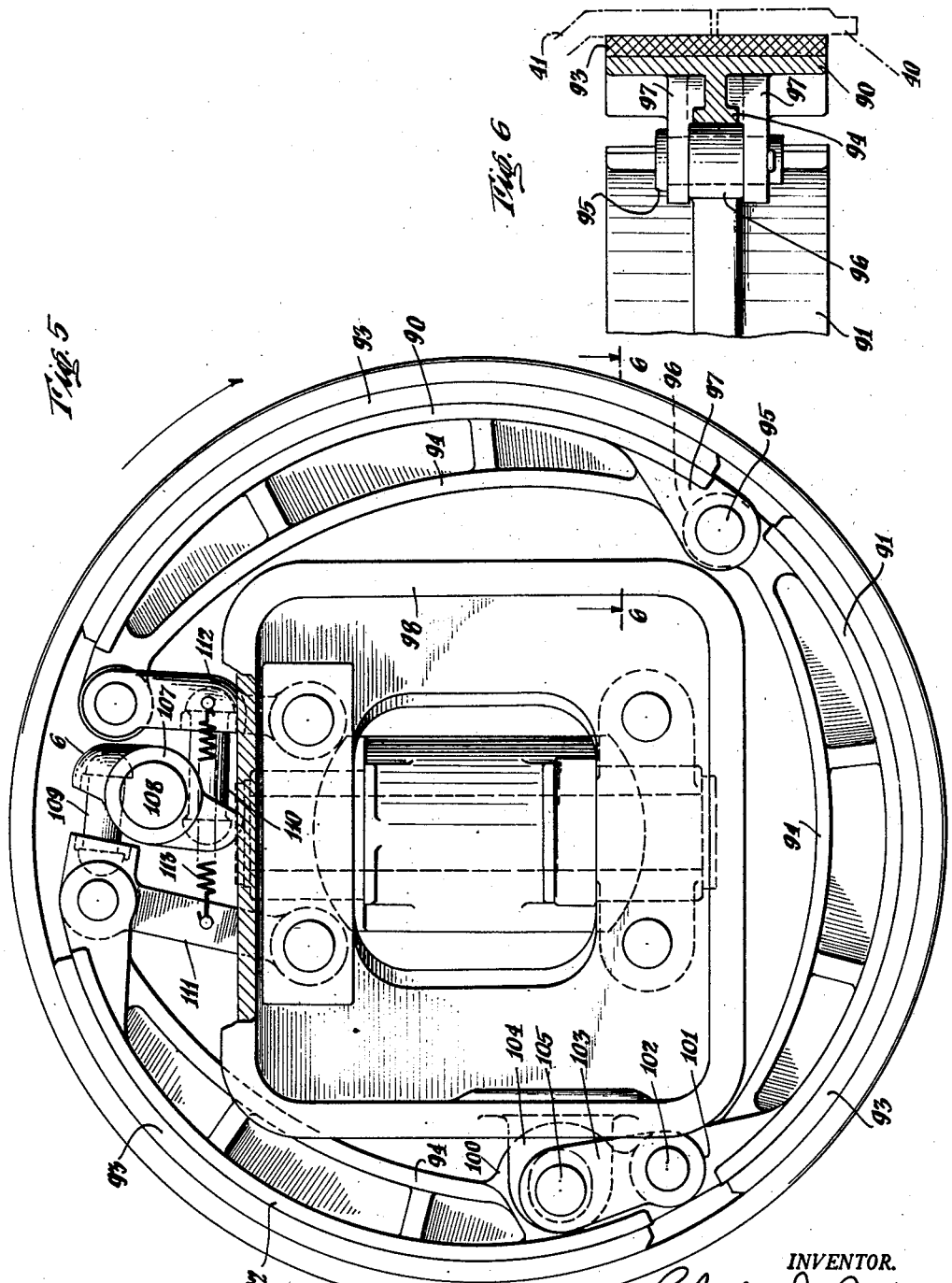
INVENTOR.
Charles S. Ash.
BY
Howard R. Dunham
Attorney Patented June 20, 1950

2,512,049

UNITED STATES PATENT OFFICE 2,512,049

EXPANSION BRAKE, INCLUDING BALANCED ACTUATING MECHANISM

Charles S. Ash, Milford, Mich.

Application October 20, 1944, Serial No. 559,504

2 Claims. (Cl. 188—78)

The present invention relates to vehicle wheel assemblies, and more particularly to braking means for such assemblies.

Objects and advantages of the invention will be set forth in part hereinafter and in part will be obvious herefrom, or may be learned by practice with the invention, the same being realized and attained by means of the instrumentalities and combinations pointed in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

It is an object of the present invention to provide improved braking means for vehicle wheel assemblies. Another object of the invention is the provision of braking means for vehicle wheels that are smooth and efficient in operation and capable of long wear without replacement or repairs. The invention further provides braking means which are relatively simple in construction and operation and thus efficient and economical to make and use. Still another object of the invention is the provision of improved braking means for dual wheel assemblies in which the individual wheels are mounted for independent relative rotation. A further object is the provision of improved brake shoe construction for vehicle brakes and improved brake shoe anchoring means.

Of the drawings:

Fig. 3 is a view of the wheel braking means shown in Fig. 1 partly in horizontal cross section and partly a plan view;

Fig. 4 is a detail view of the brake shoe anchoring means taken along line 4—4 of Fig. 2;

Fig. 5 is a side elevation of a modified form of brake shoe for the present invention; and Fig. 6 is a detail cross sectional view taken along line 6—6 of Fig. 5.

Figure 1:
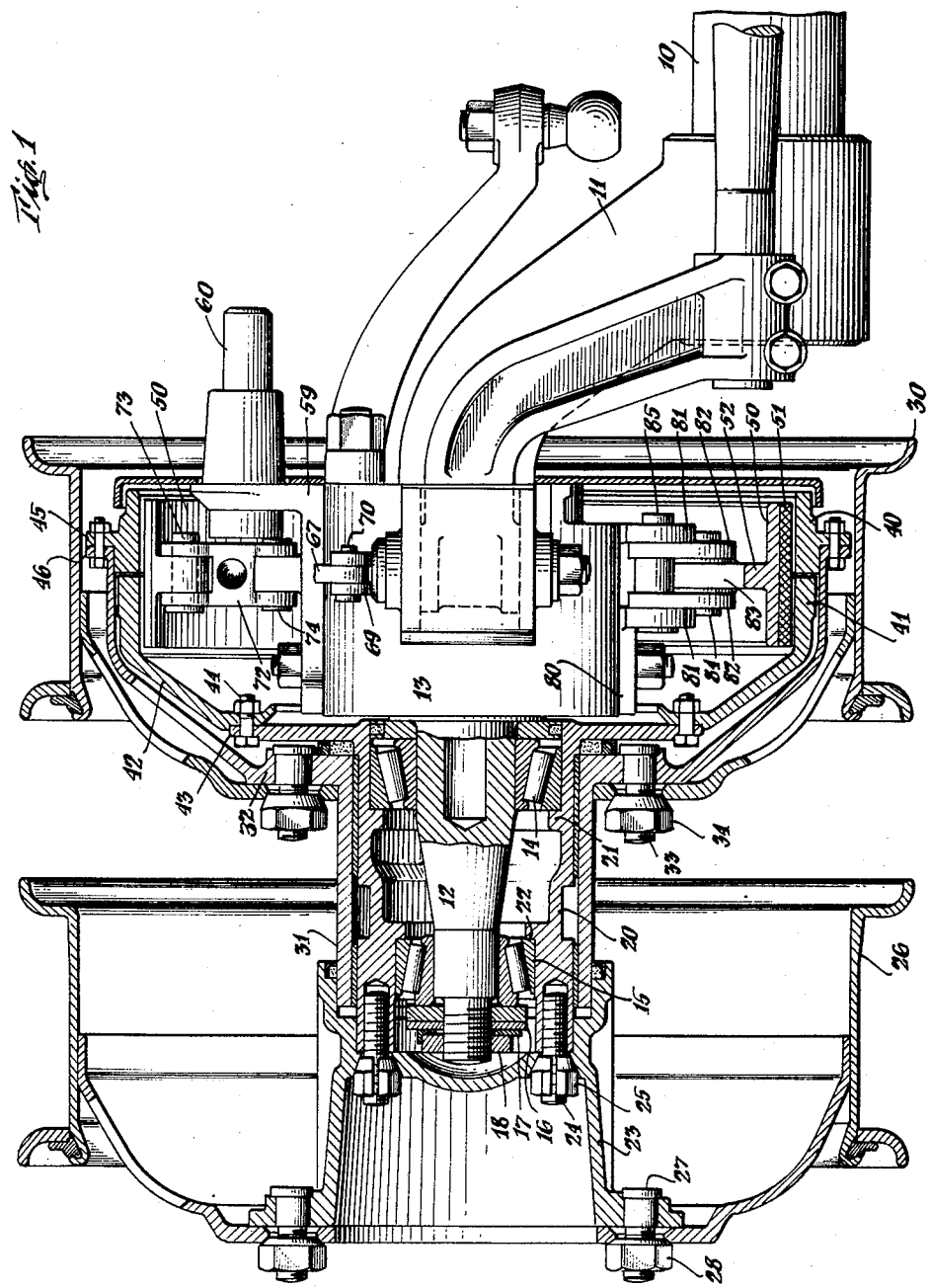
Fig. 1 is a view of a dual, dirigible, independently rotatable wheel assembly embodying braking means of the present invention, the view being partly in vertical cross section and partly a side elevation.

Referring now in detail to the illustrative embodiment of the invention shown by way of example in the accompanying drawings, braking means in accordance with the invention are shown for a dirigible dual wheel assembly in which the individual wheels are independently rotatable. As shown in Fig. 1, the wheel assembly is mounted at the end of a vehicle axle 10 upon the upwardly extending arm 11 secured to the end of the axle. The arm 11 is formed at its outer end to hold a king pin whereby the wheel spindle 12 is dirigibly mounted thereon by means of an integral box-like casting 13 which is internally formed as a yoke about the end of arm 11.

A pair of roller bearings 14 and 15 are provided on spindle 12 freely rotatably mounting a cylindrical hub 20, the hub having internal shoulders 21 and 22 against which bearings 14 and 15 are respectively seated. Washers 16 and 17 and nut 18 threaded on the end of the spindle maintain the hub and bearing assembly in place. A substantially cylindrical hub extension 23 is removably secured to the outer end of hub 20 by means of a plurality of tap bolts 24 and lock nuts 25. The outer wheel 26 of the assembly is demountably mounted on the outer end of hub extension 23 by means of mounting bolts 27, and several cooperating nuts 28. The inner wheel 30 of the assembly is mounted for free independent rotation relatively to the outer wheel 26 by means of a cylindrical hub 31 which is journalled on the outer cylindrical surface of hub 20. The outer hub 31 is provided at its inner end with an integral outwardly extending flange portion 32 on which wheel 30 is demountably mounted by means of mounting bolts 33 and nuts 34.

The embodied braking means for the dual wheel assembly comprise a pair of side by side brake drums 40 and 41 for correlative rotation with the respective wheels 26 and 30. The outer brake drum 41 has an integral annular frusto-conically formed portion 42 which is secured adjacent its inner periphery by means of bolts 44 to an outwardly radially extending flange 43 formed integrally at the inner end of hub 20. The inner brake drum 40 is secured by means of a peripheral flange 45 to a flared integral extension 46 of flange 32 of the cylindrical hub 31, the flared extension enclosing the outer brake drum 41 and its connecting portion 42.

Figure 2:
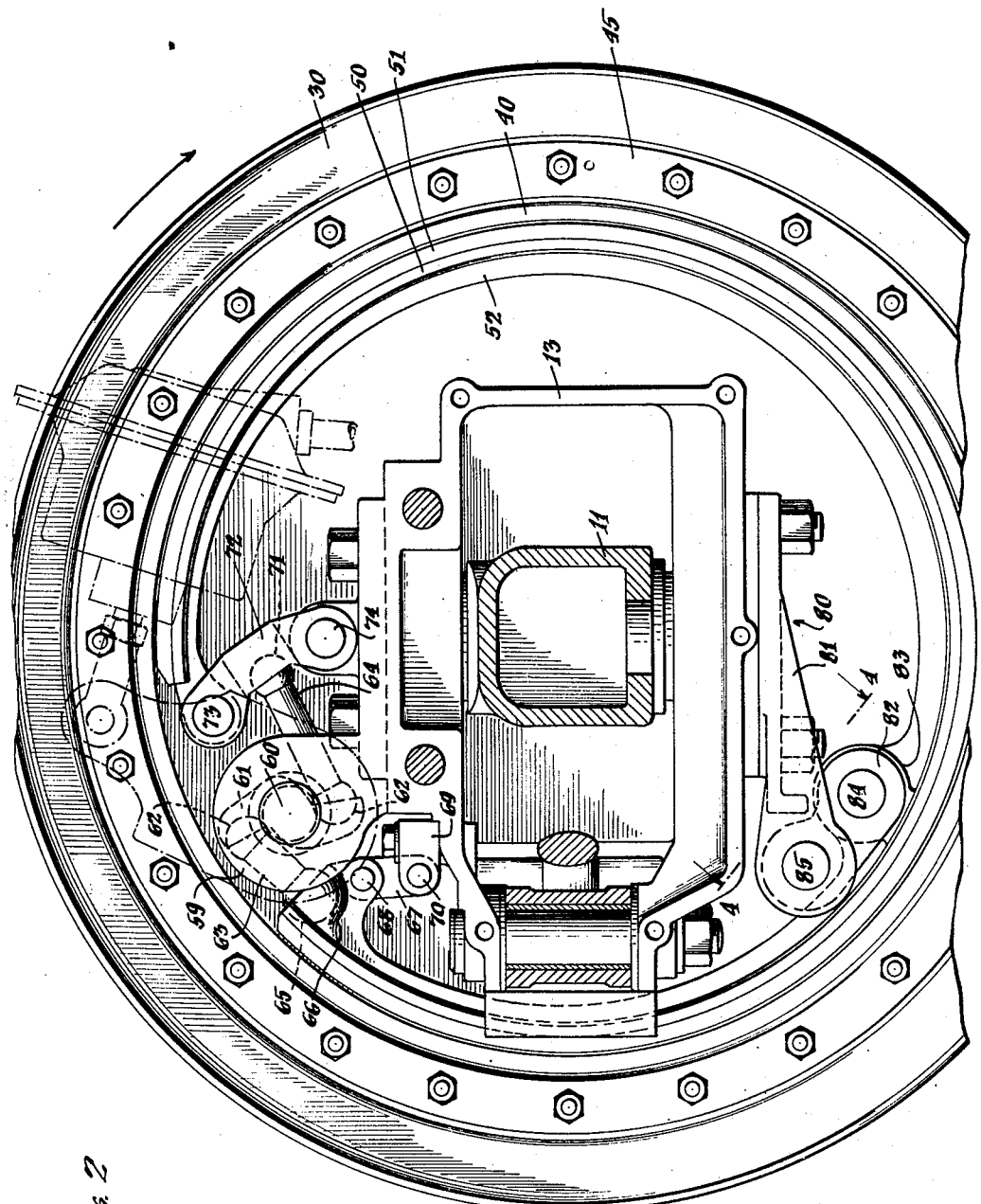
Fig. 2 is an elevation view of the wheel and brake assembly shown in Fig. 1, viewed from the inside of the assembly.

The brake drums 40 and 41 for the dual wheels are provided with common frictional means for exerting a balanced braking effort upon the wheels. As illustratively embodied these means comprise a single brake band 50 having on its outer surface the conventional layer of friction material 51, both the band and lining being of sufficient width for engagement with both of the brake drums 40 and 41. The brake shoe 50 has an integral inwardly extending rib 52 centrally of its inner periphery and extending around the full arc of the shoe. Rib 52, as shown in Fig. 2 of the drawings, is eccentric with respect to its radial width, being of somewhat lesser length at the ends of the brake shoe adjacent the expanding mechanism and becoming gradually wider around either side of the shoe, reaching a maximum width at the bottom. The rib 52 is so proportioned that brake shoe 50 will remain in substantially cylindrical shape whether in expanded drum engaging position or in retracted non-braking position, thus providing for smooth braking action and even wear of the friction material 51. Brake shoe 50 is preferably a high compression iron casting of normal shape to be out of engagement with the brake drums, returning automatically to such shape after expansion without the use of retraction springs.

The embodied expanding mechanism for brake shoe 50, as shown in Fig. 2, comprises a shaft 60 journalled in an L-shaped mount 59 which is bolted to the top of the box-like casting 13. Shaft 60 may be turned by any suitable brake actuating means (not shown) under the control of the vehicle operator to turn a brake cam 61 on the end thereof. Cam 61 is provided with a pair of concave seats 62 to accommodate spherical ends of cam pins 63 and 64 which are operatively connected to the ends of brake shoe 50. As shown, the connection in the case of pin 63 comprises a concave seat 65 in an integral enlarged end portion 66 of brake shoe 50 to accommodate the other spherical end of pin 63. The enlarged end portion 66 of brake shoe 50 also serves to secure the shoe to the box-like casting 13 through a straight link 67 which is pivotally connected to portion 67 by a pin 68, and at its other end to a knuckle 69 by pin 70, the knuckle being bolted to casting 13.

The other pin 64, has its second spherical end seated in a concave seat 71 provided in the central portion of a link 72 which is secured to an end of shoe 50 by pin 73 and to the base of L-shaped support 59 by means of pin 74. The ends of shoe 50 are thus firmly anchored through pivotal linkage to the stationary supporting member 13 of the wheel assembly, and the shoe may be expanded into frictional contact with brake drums 40 and 41 by rotary motion of cam 61.

Brake shoe 50 is also anchored by swinging link attachment to the stationary member 13 at a position intermediate its ends. As embodied, this linkage comprises a supporting member 80 bolted to the under side of casting 13, member 80 having laterally extending arms 81 enclosing a pair of links 82 which are pivotally connected to a boss 83 on the inner periphery of shoe 50, by means of a pin 84. Links 82 are also pivotally connected by means of pin 85 to the anchored arms 81.

The location of the boss 83, and thus the swinging intermediate anchorage of shoe 50, is preferably about twice as far around the shoe from the end of the shoe with linkage 72 as it is around the other arc of the shoe from the other end having linkage 67. That is, the effective braking surface of shoe 50 is substantially twice on one side of its intermediate linkage what it is at the other side of the linkage, and, as shown by the arrow in Fig. 2, the direction of rotation of the drums 40 and 41 in forward rotation of the vehicle is such as to result in a servo brake action by the greater of the frictional areas. It will be noted that the proportions and arrangement of the end links 67 and 72 of the brake shoe are such as to provide a uniform expansion of the shoe with its uncentered intermediate linkage 82, the link 72 for the greater braking surface being substantially longer than link 67 for the lesser braking surface.

The brake shoe anchoring and expanding means for shoe 50 which have been described result in uniform expansion of the shoe and uniform pressure around its circumference, eliminating noise and grabbing in the brakes and encouraging smooth, efficient operation and long wear in the friction lining 51 and other parts of the brake.

In Fig. 5 there is illustratively shown a modified embodiment of the present invention in which there are provided three substantially rigid brake shoes 90, 91 and 92 supplied with frictional surfaces 93 for engagement with brake drums 40 and 41 of the dual wheel assemby. Each brake shoe 90, 91 and 92 is provided with integral reinforcing framework 94 to insure rigidity and strength. The shoes 90 and 91 are pivotally connected at their adjacent ends by means of a pin 95 which passes through a boss 96 on the end of shoe 91 and enclosing arms 97 extending from the end of shoe 90.

Shoes 91 and 92 have a pivotal connection with each other and a swinging anchorage with the stationary casting 98 which corresponds in function and construction to the casting 13 in Fig. 1. As shown, the shoe 92 has extension arms 100 enclosing a boss 101 on the end of shoe 91 and a pin 102 extends through the members providing a pivoted connection. A link 103 is also pivotally mounted on pin 102, and likewise at its other end between extending arms 104 of casting 98 by means of pin 105.

Expansion of the brake bands into engagement with the brake drums is effected by means similar to those described in connection with the embodiment of the invention shown in Fig. 1. A cam 107 on operating shaft 108 actuates cam pins 109 and 110. Cam pin 109 engages the end of brake shoe 92, the end being pivotally connected to stationary casting 98 by means of link 111. Cam pin 110 engages the central portion of a link 112 which is pivotally secured both to casting 98 and the end of brake shoe 90. A coiled spring 113 between links 111 and 112 serves to keep the brake shoes in retracted position except when purposely moved into expanded braking position by means of shaft 108.

It will be noted that the operation of the embodiment of the invention just described is entirely similar to that of the embodiment shown in Fig. 1. In the embodiment of Fig. 5 the shoes 90, 91 and 92 are of substantially equal arcuate length and thus equal braking surface. The placement of link 103 as a swinging anchor between shoes 91 and 92 produces a servo effect by shoes 90 and 91 when the brake drums rotate in the direction of the arrow in Fig. 5 in forward rotation. Links 111 and 112 are of unequal length and so mounted and actuated as to bring the shoes 90, 91 and 92 by proportional motion into simultaneous contact with the brake drums, and the swinging anchorage 103 is relatively frictionless and prevents noise and grabbing in brake operation. In both embodiments of the invention which have been shown and described the only brake adjustment necessary is in the shafts 60 and 108 to properly position the shoes in non-braking position.

The invention in its broader aspects is not limited to the specific mechanisms shown and described but departures may be made therefrom within the scope of the accompanying claims without departing from the principles of the invention and without sacrificing its chief advantages.

What I claim is:

1. A brake comprising, in combination, a drum to rotate with a member to be braked, brake shoe means within said drum to be expanded into frictional engagement therewith said shoe means extending less than the entire circumferential extent of said drums leaving adjacent ends of said brake shoe means substantially spaced, stationary supporting means, means interconnecting said shoe means and said supporting means at a point intermediate said ends of said shoe means but not centrally of the total length of said shoe means, and means for applying expanding force to said brake shoe means to move said ends distances proportional to the distances of said ends from said intermediate point, said means for applying expanding force including a link interconnecting one of said ends and said supporting means and means for applying an expanding force directly to the other of the ends of said brake shoe means and to said link intermediate the ends thereof.

2. A brake comprising, in combination, a drum to rotate with a member to be braked, brake shoe means within said drum to be expanded into frictional engagement therewith said shoe means extending less than the entire circumferential extent of said drums leaving adjacent ends of said brake shoe means substantially spaced, stationary supporting means, means interconnecting said shoe means and said supporting means at a point intermediate said ends of said shoe means but not centrally of the total length of said shoe means, said interconnecting means comprising a link the ends of which are pivotally connected respectively to said supporting means and said shoe means, and means for applying expanding force to said brake shoe means to move said ends distances proportional to the distances of said ends from said intermediate point, said means for applying expanding force including a second link interconnecting one of said ends and said supporting means and means for applying an expanding force directly to the other of the ends of said brake shoe means and to said second link intermediate the ends thereof.

CHARLES S. ASH.

REFERENCES CITED

The following references are of record in the file of this patent:

UNITED STATES PATENTS

| Number | Name | Date |
|---|---|---|
| 1,658,288 | Hardison | Feb. 7, 1928 |
| 1,727,797 | Taub et al. | Sept. 10, 1929 |
| 1,737,025 | Sanford | Nov. 26, 1929 |
| 1,739,783 | Christensen | Dec. 17, 1929 |
| 2,196,520 | Butler | Apr. 9, 1940 |
| 2,334,692 | Ash | Nov. 23, 1943 |

FOREIGN PATENTS

| Number | Country | Date |
|---|---|---|
| 324,439 | Great Britain | Jan. 30, 1930 |